United States Patent [19]
Balmisse et al.

[11] Patent Number: 4,923,746
[45] Date of Patent: May 8, 1990

[54] PROCESS FOR PRODUCING PADDINGS MOLDED FROM POLYURETHANE FOAM COMPRISING SEVERAL REGIONS OF DIFFERENT PLIABILITY, AND PADDINGS THUS PRODUCED

[75] Inventors: Michel Balmisse; Georges Molinari, both of Erstein, France

[73] Assignee: Roth Freres, Societe Anonyme, Strasbourg, France

[21] Appl. No.: 252,911

[22] Filed: Sep. 27, 1988

Related U.S. Application Data

[63] Continuation-in-part of Ser. No. 53,671, May 26, 1987, abandoned.

[30] Foreign Application Priority Data

May 23, 1986 [FR] France .................. 86 07521

[51] Int. Cl.$^5$ .................. A47C 7/00; B29C 67/22
[52] U.S. Cl. .................. 428/309.9; 264/45.1; 264/46.4; 264/46.5; 264/46.6; 428/316.6
[58] Field of Search .................. 264/45.1, 46.2, 46.3, 264/46.4, 46.5, 46.6, 48; 428/309.9, 316.6

[56] References Cited

U.S. PATENT DOCUMENTS

| | | | |
|---|---|---|---|
| 3,141,595 | 7/1964 | Edwards | 264/46.3 |
| 3,257,149 | 6/1966 | Fruchte et al. | 264/46.6 |
| 3,393,258 | 7/1968 | Fultz et al. | 264/45.1 |
| 3,863,908 | 2/1975 | Charpentier | 264/45.5 |
| 3,918,863 | 11/1975 | Rhodes | 425/177 |
| 4,246,213 | 1/1981 | Takmatsu et al. | 264/46.7 |

FOREIGN PATENT DOCUMENTS

| | | |
|---|---|---|
| 3123340 | 12/1982 | Fed. Rep. of Germany . |
| 58-112715 | 7/1983 | Japan .................. 264/45.1 |
| 58-203027 | 11/1983 | Japan . |
| 1244284 | 8/1971 | United Kingdom . |

Primary Examiner—Jan H. Silbaugh
Assistant Examiner—Allan Kuhns
Attorney, Agent, or Firm—Young & Thompson

[57] ABSTRACT

A process for producing paddings molded from polyurethane foam including several regions of different pliability, as well as the paddings thus produced. The process includes dividing a mold (1) into compartments and positioning therein one or several collecting vessels (2) and/or one or several partitions (3) of expanded polystyrene, simultaneously pouring different foaming mixtures of polyurethane of different pliability each into one of the volumes delimited by the walls of the partitions (3) and of the mold (1) and/or by the walls of the collecting vessels (2), covering the mold (1), subjecting the mold (1) filled with polyurethane foams to a temperature provided by an exterior heat source and/or by the exothermic reaction of the molds, so as to obtain not only polymerization of the polyurethane molds, but also contraction of the expanded polystyrene, this contraction at the temperature (T) causing transformation of the said expanded polystyrene into a layer (6) of fine, compact and pliable material serving to interconnect the polyurethane foams of different pliability which were simultaneously poured.

11 Claims, 3 Drawing Sheets

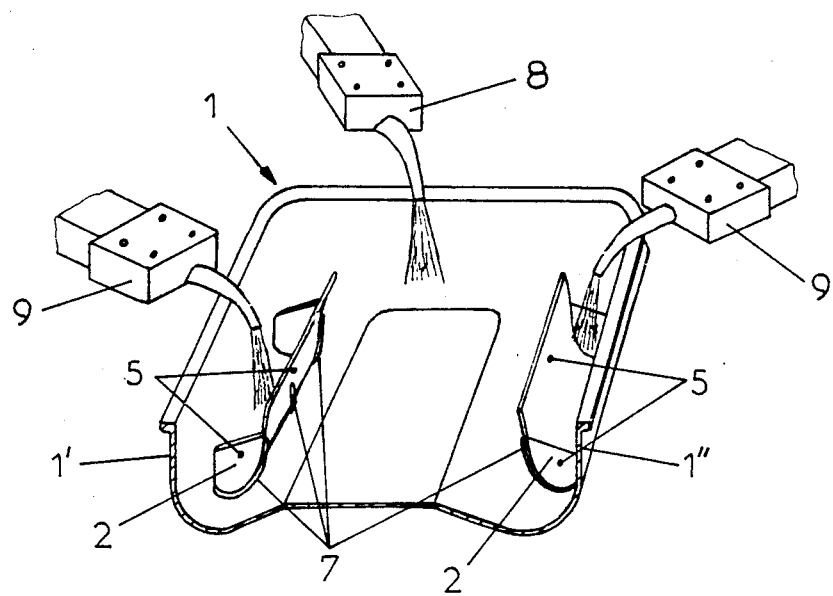
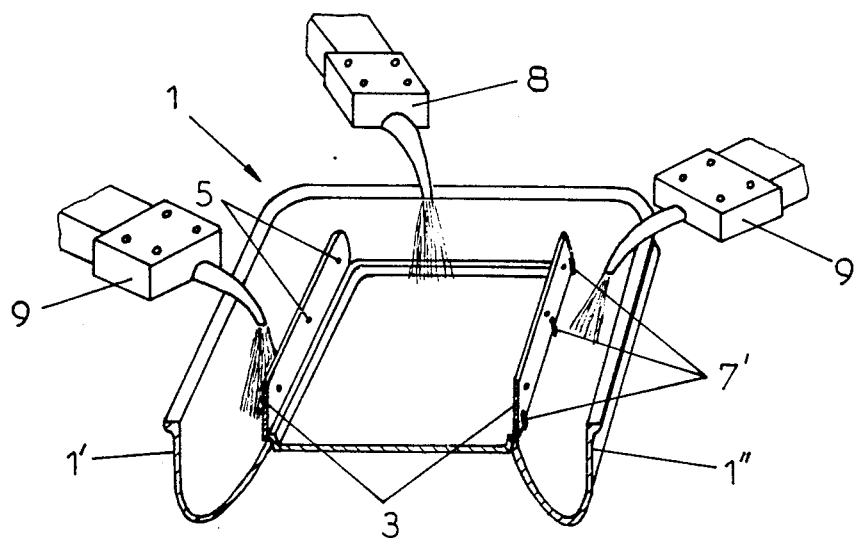

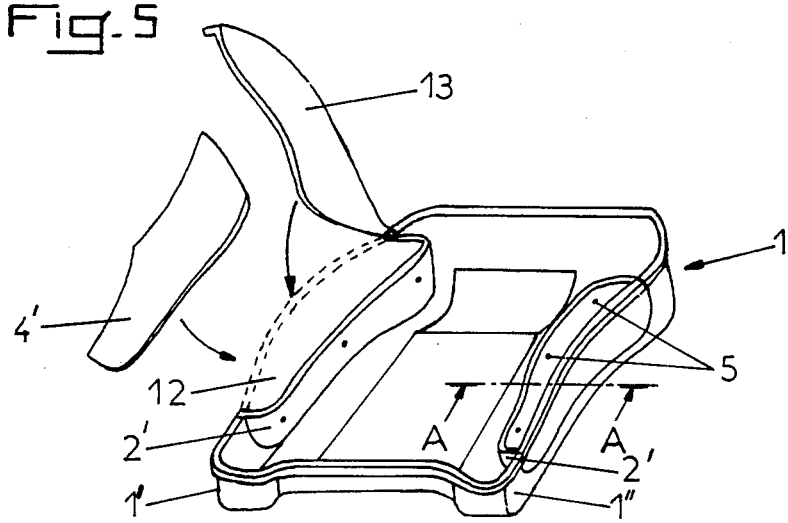
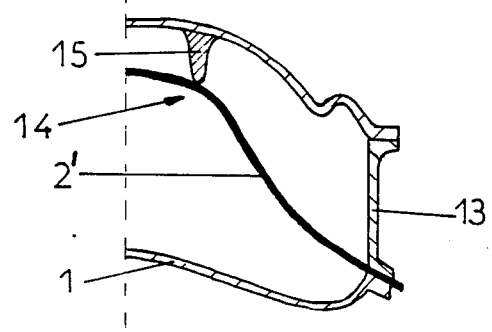
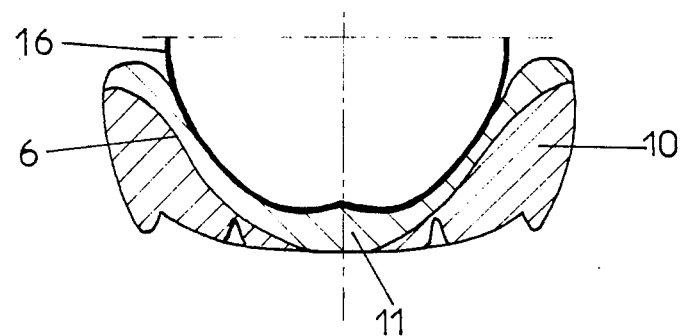

PROCESS FOR PRODUCING PADDINGS MOLDED FROM POLYURETHANE FOAM COMPRISING SEVERAL REGIONS OF DIFFERENT PLIABILITY, AND PADDINGS THUS PRODUCED

This application is a continuation-in-part of our co-pending application Ser. No. 07/053,671, filed May 26, 1987.

The present invention concerns the field of elements molded from polyurethane foam and has for an object a process for producing paddings molded from polyurethane foam comprising several regions of different pliability.

At present, it is known that by pouring into a mold a mixture of isocyanate, polyol, activator, catalyst and water, a molding mixture is produced which expands in the mold and permits obtaining, after polymerization in this mold, a pliable padding of polyurethane foam.

This type of padding has the same pliability at all points, whereas on the contrary it is frequently desirable for it to have regions of different pliability, for example, a pliable region in the central part of a chair, which corresponds to the support or contact region of the back, and a firmer region in the side parts of the chair, which corresponds to a support zone.

It has thus been proposed to pour simultaneously in one mold a foamable mixture of a pliable quality in the central portion and a foamable mixture of a firm quality in the side portions, the two foaming mixtures expanding simultaneously, such that the cushion obtained has a pliable central portion and firm side portions.

But to obtain a satisfactory delimitation of the pliability regions, it is essential to divide the mold into compartments, for each cooling region, by metal partitions several centimeters tall fixed to the base of the mold and intended to prevent the foaming mixtures from mixing before the expansion is sufficiently developed.

It thus results that the padding, after production, has undesirable molded slits on its surface, of a thickness and depth corresponding to these partitions.

Moreover, the firm regions may provide good support, but they are no less disagreeable from the standpoint of comfort, as the production process doesn't permit the portions of firm foam to be covered with a certain thickness of pliable foam.

Finally, the present production processes don't permit juxtaposing zones of different pliability, whereas it is frequently desirable to superpose them.

The present invention has as an object to overcome these disadvantages.

Specifically, it has as an object a process for producing a padding molded from polyurethane foam having several juxtaposed and/or superposed regions of different flexibility, characterized in that it consists of dividing a mold into compartments and disposing therein one or several collecting vessels and/or one or several partitions of expanded polystyrene, simultaneously pouring different foamable polyurethane mixtures of different pliability each in one of the volumes delimited by the partition walls and by the mold, and/or by the walls of the collecting vessels, covering the mold, subjecting the mold filled with polyurethane foams to the temperature generated by an exterior heat source and/or the exothermic reaction of the foams, so as to obtain not only polymerization of the polyurethane molds, but also contraction of the expanded polystyrene, this contraction occurring at the temperature determining the transformation of the said expanded polystyrene into a layer of fine compact and pliable material serving to interconnect the polyurethane foams of different pliabilities, which have simultaneously been poured.

The invention will be best understood thanks to the following description which relates to preferred embodiments, given by way of non-limiting example, and explained with reference to the accompanying schematic drawings, in which:

FIG. 1 is a perspective view partially in section of an open mold, provided with two collecting vessels, at the time of pouring the mixtures of polyurethane foam according to the production process of the invention;

FIG. 5 is a perspective view of an open mold at the time of positioning a sheet of expanded polystyrene, according to a variation of the process giving it the shape of a collecting vessel;

FIG. 6 is a front sectional view taken along the line A—A of FIG. 5, the cover of the mold being provided with a stud;

FIG. 7 is a sectional view of a seat cushion thus obtained and receiving the buttocks of a user;

FIG. 8 is a perspective view partially in section of an open mold provided with two partitions, at the time of pouring the foamable polyurethane mixtures according to the production process of the invention;

Figure 2:
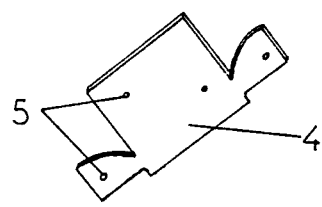
FIG. 2 is a perspective view of a cut-away plate according to the production process of the invention.

According to the invention, the production process consists of dividing a mold 1 into compartments and placing therein one or several collecting vessels 2 and/or one or several partitions 3 of expanded polystyrene, simultaneously pouring different foamable polyurethane mixtures of different pliability each in one of the volumes delimited by the walls of the partitions 3 and of the mold 1 and/or by the walls of the collecting vessels 2, covering the mold 1, subjecting the mold 1 filled with polyurethane foams t the temperature provided by an exterior heat source and/or by the exothermic reaction of the foams, so as to obtain not only polymerization of the polyurethane foams, but also contraction of the expanded polystyrene, this contraction at the temperature T determining the transformation of the said expanded polystyrene into a layer 6 of fine compact and pliable material serving to interconnect the polyurethane foams of different pliability that were simultaneously poured.

The transformation by contraction of the expanded polystyrene is obtained by subjecting the mold 1 filled with polyurethane foam to the temperature T provided by an exterior heat source and/or by the exothermic reaction of the molds, such that the expanded polystyrene is subjected to its contraction temperature comprised between 80° C. and 130° C. for a duration of about 120 to 180 seconds, preferably at 100° C. for 150 seconds.

According to a characteristic of the invention, the partitions 3 and/or the collecting vessels 2 are fashioned as plates 4 of expanded polystyrene of a density of 8 to 20 g/dm$^3$, preferably 15 g/dm$^3$, and a thickness of 1 to 4 mm, preferably 2 mm, the contraction of which is effected at a temperature T comprised between 70° C. and 150° C., causing during the polymerization phase the transformation by contraction of the said expanded polystyrene into a layer 6 of fine, compact and pliable material serving to interconnect the polyurethane foams of different pliability which were simultaneously poured.

Thus the process consists of cutting away, or fashioning for example in press, the plates 4 of expanded polystyrene, placing them in the interior of the mold 1 so as to form partitions 3 and/or collecting vessels 2, maintaining them in place in the mold 1 by any known means such as supports, slots or clips, simultaneously pouring different foamable polyurethane mixtures of different pliability, each in one of the volumes delimited by the walls of the partitions 3 and of the mold 1 and/or by the walls of the collecting vessels 2, covering the mold 1, subjecting the mold 1 filled with polyurethane foams to the temperature provided by an exterior heat source and/or by the exothermic reaction of the foams so as to obtain not only polymerization of the polyurethane foams, but also contraction of the expanded polystyrene, this contraction at the temperature T causing the transformation of the said expanded polystyrene into a layer 6 of fine, compact and pliable material serving to interconnect the polyurethane foams of different pliability which were simultaneously poured.

The interconnection of the polyurethane foams constituting the different pliability regions may also be fortified by forming in the plates 4, before or after they are cut away, openings 5 on the order to 0.5 to 2 mm in diameter, to form anchorage points between the different foams, which thus reinforces their cohesion.

According to another characteristic of the invention, the expanded polystyrene sheets are initially thermally surface treated by placing them between two smooth metallic plates, or two calender rollers, heated to a temperature t comprised between 100° C. and 140° C., preferably 130° C., for a duration of about 0.6 to 1.8 seconds, preferably 1.2 seconds, this thermal surface treatment of the sheets in contact with the two heating plates or rollers causing, on the one hand, a smoothing of the upper and lower surfaces of each expanded polystyrene sheet and, on the other hand, a partial contraction of the expanded polystyrene balls forming each sheet, thus causing a reduction of the surface defined by the touching surfaces of the balls and consequently a multitude of tiny holes therein, where due to contraction of the said balls, a partial disintegration has been effected.

Additionally, and according to the invention, thanks to the partial contraction of the expanded polystyrene balls and to their partial disintegration, the overall sheet, which was relatively brittle prior to the treatment, is now pliable, flexible, and thus susceptible to being shaped so as to form small collecting vessel 2 or 2'.

Finally, and according to the invention, the smoothing of the surfaces of the expanded polystyrene sheet permits the polyurethane foaming mixtures poured in the mold 1 to expand and slide freely the length of the partial walls 3 or collecting vessels 2, 2' of expanded polystyrene, which permits obtaining perfectly executed polyurethane foam in 2 contact with these partitions 3 or collecting vessels 2, 2', any parasitic air bubbles, cracks or defects being consequently suppressed.

Figure 3:
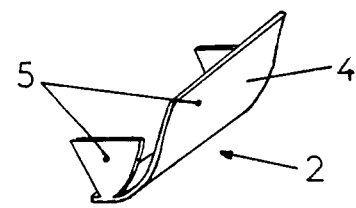
FIG. 3 is a perspective view of a collecting vessel formed according to the process of the invention.

In a first embodiment of the process, a sheet 4 of polystyrene foam is cut away or fashioned so as to form two collecting vessels 2 serving as partitions (see FIGS. 2 and 3).

These vessels are then placed on the side portions 1' and 1" of the mold 1 and maintained in place, for example by supports 7 fixed to the mold 1. Two foamable polyurethane mixtures are then poured, a casting head 8 pouring a pliable foaming mixture in the central portion of the mold 1 and two casting heads 9 pouring a less pliable foaming mixture in the collecting vessels 2 of polystyrene foam (see FIG. 1).

After pouring of these different foaming mixtures, the mold is covered with a cover and the foam and the expanded polystyrene are subjected to a temperature of about 100° C., either solely by the exothermic reaction of the polyurethane foam itself, or by additionally placing the mold 1 in a furnace, for example. For an interval of 150 seconds during the polymerization phase, the partial contraction of the collecting vessels 2 of polystyrene foam is effected, this contraction causing the transformation of the polystyrene foam into a layer 6 of fine compact material serving as an agent to interconnect the different qualities of foam.

Figure 4:
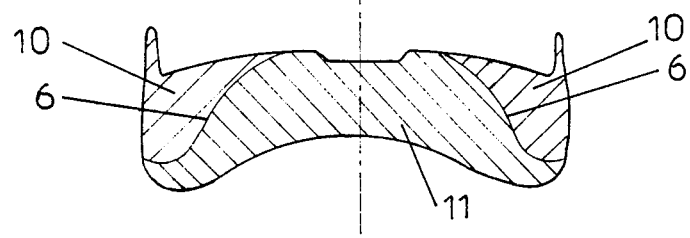
FIG. 4 is a sectional view of a seat cushion formed according to the process of the invention.

FIG. 4 shows a sectional view of a seat cushion produced by the mold. The side parts 10 of the cushion are of a firm foam, separated from the central portion 11 of the flexible foam cushion by the layer 6 of fine compact material serving to interconnect the different polyurethane foams.

It will be noted that, according to the invention, the pliable foam, thanks to a positioning of the collecting vessels 2 for partitioning the polystyrene foam, covers the side portions 10 of firm foam, thus assuring excellent superficial comfort.

As shown in FIGS. 5 and 6, it is possible to make the collecting vessels 2' in an economic manner by exploiting, according to the invention, the flexibility and deformability resulting from the thermal surface treatment of the expanded polystyrene sheets and making the said collecting vessels 2' from the said sheets.

According to this variation, once the expanded polystyrene sheets 4' have been initially thermally surface treated, they are placed and fixed in the interior of the mold 1, in such a manner as to form the partitions 3 and/or the collecting vessels 2', the shape of the collecting vessel 2' being achieved, for example, by placing the plates 4' in the openings 12 defined by the hinged walls 13 of the mold 1, closure of the said walls 13 serving to fix and position the sheets 4' which adopt the lower contour of the openings 12, thus conferring to each sheet 4' its shape as a collecting vessel 2'. It is also possible to provide each collecting vessel 2, 2' with a countermold giving an ergonomic shape to the polyurethane foams, which are molded in the mold 1 thanks to a stud 15 preferably disposed on the interior of the cover of the mold 1 (FIG. 6).

FIG. 7 shows the ergonomic nature of a cushion thus obtained, receiving the buttocks of a user 16.

On the other hand, when it is desired that the side parts 10 of a cushion be of a firm foam, without superficial comfort, for example for stadium chairs, the mold 1 is divided into compartments by means of expanded polystyrene partitions 3 fashioned to the desired dimensions and fixed for example by clips 7'. The different foaming mixtures of polyurethane foam are poured in the same manner, then after having sealed the mold 1 with its cover, the polymerization is effected as previously described (FIG. 8).

Figure 9:
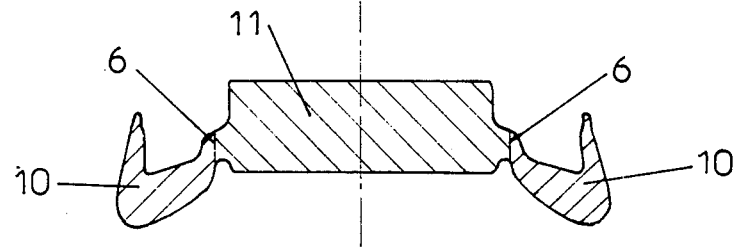
FIG. 9 is a sectional view of a variation of the seat pad produced according to the process of the invention.

FIG. 9 shows an embodiment of a seat cushion produced by the mold 1, the pliable foam of the central portion 11 of the cushion being similarly separated from the firm foam of the side parts 10 of the cushion by a layer 6 of fine and compact material serving to interconnect the different polyurethane foams.

Figure 10:
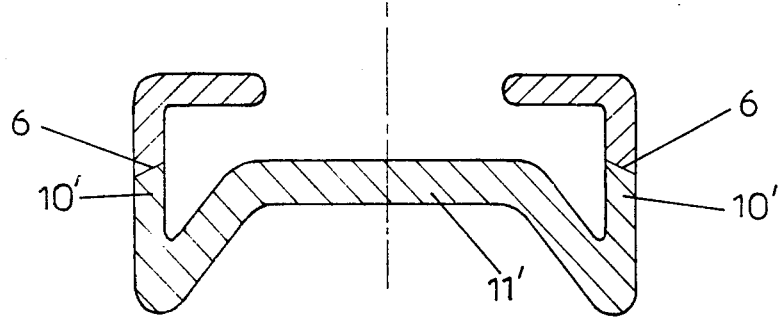
FIG. 10 is a sectional view of a backrest pad formed according to the process of the invention.

FIG. 10 shows a backrest cushion as produced by the mold, the pliable polyurethane foam constituting the central part 11' and the forward portion of the side parts 10' of the backrest, and the firm foam constituting the rear of the side parts 10' of the backrest, the front and rear of the side parts 10' being separated by layer 6 of fine and compact material serving to interconnect the different polyurethane foams.

This embodiment is obtained by placing the collecting vessels of polystyrene foam in an upper region of the side walls of the mold. Thus the pliable foam poured in the base of the mold is able to expand only up to the height of the collecting vessels of polystyrene foam, forming a barrier, whereas the firm foam poured into these collecting vessels of polystyrene foam is expanded in the upper part of the mold.

This embodiment shows the molding of a polyurethane foam padding having two superposed regions of different pliability.

It goes without saying that the paddings shown in FIGS. 4, 9 and 10 are only non-limiting examples of paddings of polyurethane foam and that the invention has as an object any paddings having two or more regions of pliability, of perfect dimensions, entirely interconnected, free of any undesired slit, permitting any applications fulfilling the needs of support and comfort.

It will be understood that the invention is not limited to the embodiments described and shown in the accompanying drawings. Modifications remain possible particularly from the point of view of the constitution of the various elements or by substitution of equivalent techniques, without departing whatsoever from the scope of the protection of the invention.

What is claimed is:

1. Process for producing a padding molded from polyurethane foam having several juxtaposed and/or superposed regions of different pliability, characterized in that it consists of dividing a mold (1) into compartments and placing therein one or several collecting vessels (2) and/or one or several partitions (3) of expanded polystyrene, simultaneously pouring different foamable polyurethane mixtures of different pliability each into one of the volumes delimited by the walls of the partitions (3) and of the mold (1) and/or by the walls of the collecting vessels (2), covering the mold (1), subjecting the mold (1) filled with polyurethane foams to a temperature (T) provided by an exterior heat source and/or by the exothermic reaction of the foams, said temperature (T) being such as to obtain not only polymerization of the polyurethane foams, but also contraction of the expanded polystyrene, this contraction at the temperature (T) causing the transformation of the said expanded polystyrene into a layer (6) of fine, compact and pliable material serving to interconnect the polyurethane foams of different pliability which were simultaneously poured.

2. Process according to claim 1, characterized in that the transformation by contraction of the expanded polystyrene is obtained by subjecting the mold (1) filled with polyurethane foam to a temperature (T) provided by an exterior heat source and/or by the exothermic reaction of the foams, such that the expanded polystyrene is subjected to its contraction temperature comprised between 80° C. and 130° C. for about 120 to 180 seconds.

3. Process according to claim 2, characterized in that the partitions (3) and/or the collecting vessels (2) are fashioned as sheets (4) of expanded polystyrene having a density of 8 to 20 g/dm³, and a thickness of 1 to 4 mm, the contraction of which is effected at a temperature (T) comprised between 70° C. and 150° C., causing during the polymerization phase the transformation by contraction of the said expanded polystyrene into a layer (6) of fine, compact and pliable material serving as an agent to interconnect the polyurethane foams of different pliability which were simultaneously poured.

4. Process according to claim 1, characterized in that openings (5) on the order to 0.5 to 2 mm are effected in the sheets (4) before or after their shaping, so as to promote the interconnection of the foams by anchorage points which reinforce the cohesion of the said foams.

5. Process according to claim 1, characterized in that the expanded polystyrene sheets are initially thermally surface treated by placing them between two smooth metallic plates, or two calender rollers, heated to a temperature (T) comprised between 100° C. and 140° C., for about 0.6 to 1.8 seconds, this thermal surface treatment of the sheets in contact with the two heating plates or rollers causing, on the one hand, a smoothing of the upper and lower surfaces of each expanded polystyrene sheet and, on the other hand, a partial contraction of the expanded polystyrene balls constituting each sheet, thus causing a reduction of the surface of contact between the individual balls and consequently a multitude of tiny holes therein, where because of the contraction of the said balls, a partial disintegration is effected.

6. Process according to claim 5, characterized in that, once initially thermally surface treated, the plates (4') of expanded polystyrene are positioned and fixed in the inside of a mold (1), so as to form partitions (3) and/or collecting vessels (2'), the shape of the collecting vessel (2') being obtainable by positioning the sheets (4') in openings (12) defined by hinged walls (13) of the mold (1), closure of the said walls (13) causing fixation and positioning of the sheets (4') which adopt the lower contour of the openings (12), conferring to each sheet (4') its shape as a collecting vessel (2').

7. Process according to claim 6, characterized in that a countermold (14) is provided for each collecting vessel (2, 2') imparting an ergonomic shape to the polyurethane foams which are molded in the mold (1) thanks to a stud (15) disposed on the interior of the cover of the mold (1).

8. Molded padding produced by the process of claim 1.

9. Process according to claim 2, wherein said expanded polystyrene is subjected to its contraction temperature at 100° C. for 150 seconds.

10. Process according to claim 3, wherein said sheets (4) of expanded polystyrene have a density of 15 g/dm³ and a thickness of 2 mm.

11. Process according to claim 5, wherein said expanded polystyrene sheets are thermally surface treated at a temperature (T) of 130° C. for about 1.2 seconds.

* * * * *